United States Patent
Lachenmaier

(10) Patent No.: US 10,195,691 B2
(45) Date of Patent: Feb. 5, 2019

(54) PROCESS FOR INFLUENCING THE SURFACE CONDITION OF A LASER WELD SEAM AS WELL AS A COMPONENT

(71) Applicant: Bayerische Motoren Werke Aktiengesellschaft, Munich (DE)

(72) Inventor: Markus Lachenmaier, Moorenweis (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 972 days.

(21) Appl. No.: 14/561,551

(22) Filed: Dec. 5, 2014

(65) Prior Publication Data

US 2015/0158122 A1 Jun. 11, 2015

(30) Foreign Application Priority Data

Dec. 9, 2013 (DE) ........................ 10 2013 225 260

(51) Int. Cl.
| | |
|---|---|
| *B23K 26/24* | (2014.01) |
| *B23K 26/244* | (2014.01) |
| *B23K 26/06* | (2014.01) |
| *B23K 26/02* | (2014.01) |
| *B23K 26/044* | (2014.01) |
| *B23K 26/242* | (2014.01) |
| *B23K 26/211* | (2014.01) |
| *B23K 101/00* | (2006.01) |

(52) U.S. Cl.
CPC .............. *B23K 26/24* (2013.01); *B23K 26/02* (2013.01); *B23K 26/044* (2015.10); *B23K 26/0648* (2013.01); *B23K 26/211* (2015.10); *B23K 26/242* (2015.10); *B23K 26/244* (2015.10); *B23K 2101/006* (2018.08); *Y10T 403/477* (2015.01); *Y10T 428/265* (2015.01)

(58) Field of Classification Search
CPC .. B23K 26/02; B23K 26/044; B23K 26/0648; B23K 26/211; B23K 26/24; B23K 26/242
See application file for complete search history.

(56) References Cited

U.S. PATENT DOCUMENTS 5,897,796 A * 4/1999 Forrest .................. B23K 26/10
 219/121.64
6,642,473 B2 * 11/2003 Stiers .................. B21D 39/021
 219/121.63

(Continued)

FOREIGN PATENT DOCUMENTS

| CA | 2326896 A | * | 5/2001 |
|---|---|---|---|
| CN | 1156076 A | | 8/1997 |

(Continued)

OTHER PUBLICATIONS

Trui et al., "The Behavior of Iron Oxide Film on Laser Welds", National Meeting of Japanese Welding Society, Oct. 2008.*

(Continued)

*Primary Examiner* — Geoffrey S Evans
(74) *Attorney, Agent, or Firm* — Crowell & Moring LLP

(57) ABSTRACT

A process is provided for influencing the surface condition of a laser weld seam, wherein at least one laser beam is guided over a joint of a component. The process parameters being selected such that a weld seam and an iron-oxide-containing layer adhering to the weld seam are formed at the joint.

15 Claims, 1 Drawing Sheet

(56) References Cited

U.S. PATENT DOCUMENTS

| | | | | |
|---|---|---|---|---|
| 2002/0170889 | A1* | 11/2002 | Faitel | B23K 26/02 219/121.63 |
| 2006/0006697 | A1* | 1/2006 | Debuan | B60J 5/0469 296/193.01 |
| 2006/0144826 | A1* | 7/2006 | Becker | B29C 65/16 219/121.64 |
| 2008/0205471 | A1* | 8/2008 | Harrer | B23K 26/123 372/58 |
| 2011/0170946 | A1 | 7/2011 | Schneegans et al. | |

FOREIGN PATENT DOCUMENTS

| | | | |
|---|---|---|---|
| DE | 41 24 976 A1 | | 1/1993 |
| DE | 100 31 377 A1 | | 1/2002 |
| DE | 10 2007 002 856 A1 | | 7/2008 |
| EP | 1 331 058 A1 | | 7/2003 |
| JP | 58-074294 A | * | 5/1983 |
| JP | 58-74294 A | | 5/1983 |
| JP | 08-052512 | * | 2/1996 |
| JP | 2001-113385 A | * | 4/2001 |
| JP | 2003-290946 A | * | 10/2003 |
| WO | WO 2008/031210 A1 | | 3/2008 |

OTHER PUBLICATIONS

Xie et al., "Laser Welding of Thin Sheet Steel with Surface Oxidation", Welding Research Supplement, pp. 343-s to348-s, Oct. 1999.*
Machine translation of Japan Patent document No. 8-052,512, Sep. 2017.*
Machine translation of Japan Patent document No. 2001-113,385, Sep. 2017.*
Machine translation of Japan Patent document No. 2003-290,946, Sep. 2017.*
Trui et al., english abstract of the article "The behavior of iron oxide film on Laser welds", Japan Welding Society, Oct. 2008.*
Translation of "Oxide film formation behaviot on laser welded part", PTO 12593, Feb. 2018, pp. 1-8.*
German Search Report dated Mar. 10, 2014 with partial English translation (10 pages).
Chinese Office Action issued in counterpart Chinese Application No. 201410645600.3 dated Jan. 15, 2016 with English translation (17 pages).

* cited by examiner

PROCESS FOR INFLUENCING THE SURFACE CONDITION OF A LASER WELD SEAM AS WELL AS A COMPONENT

CROSS REFERENCE TO RELATED APPLICATION

This application claims priority under 35 U.S.C. § 119 from German Patent Application No. 10 2013 225 260.9, filed Dec. 9, 2013, the entire disclosure of which is herein expressly incorporated by reference.

BACKGROUND AND SUMMARY OF THE INVENTION

The invention relates to a process for influencing the surface condition of a laser weld seam as well as to a component having a laser weld beam.

Components joined by laser welding, such as a motor vehicle body component in the construction of vehicles, frequently have to be painted after the welding process. In this case, the painting process may comprise several steps, such as a pretreatment, for example, a phosphating, the application of a corrosion protection primer, such as a cathodic dip paint (KTL), and the application of primers/fillers, a base coat and a clear coat.

During the welding process of steel materials, particularly during laser beam welding with tactile seam guidance, different impurities occur on the weld seam surface, such as various iron oxides. These impurities resulting from the welding process are generally called scale. Scale adheres only insufficiently to the material. Scale can also not be phosphated. As a result, weld seams with impurities caused by scale lead to a deficient adhesion of cathodic dip paint or paint.

The impurities are normally removed for improving the adhesion of paint. For this purpose, the weld seams are subjected to finishing; for example, the impurities/scales are removed by a mechanical brushing-off of the weld seams or by means of dry ice. However, these process steps are difficult to control because there are no parameters to be monitored. Frequently, a complete removal of the impurities cannot be reliably ensured. There may also be undesirable zinc abrasion. Additional space and time demands caused by a cleaning of the weld seams are also disadvantageous.

It is therefore an object of the invention to provide a simple and cost-effective process by which the paint adhesion on welded components can be improved, as well as a corresponding component having a weld.

This and other objects are achieved by a process according to the invention for influencing the surface condition of a laser weld seam, wherein a laser beam is guided over a joint of a component. The process parameters are selected such that a weld seam and an iron-oxide-containing layer adhering to the weld seam are formed at the joint.

Particularly in high-volume production, the occurrence of impurities on the weld seam cannot be completely avoided. However, the invention is based on the recognition that the impurities can be influenced by a suitable selection of parameters, so that they will no longer impair subsequent painting processes. More precisely, the process parameters of the welding process are selected such that an adhering iron-oxide-containing layer is formed on the weld seam.

The iron-oxide-containing layer adheres to the weld seam. This means that the iron-oxide-containing layer meets the requirements of an adhesive-tape tear-off test. During the adhesive-tape tear-off test, an adhesive tape is pressed firmly with an adhesive force on steel of 4.6±0.5 N/cm parallel along the laser weld seam and is abruptly pulled off at an angle of 60°. The welded component is painted before the adhesive tape is applied; for example, the component may be painted by means of a cathodic dip paint or may be painted completely, i.e. have several layers of paint. When the adhesive tape is torn off, non-adhering or poorly adhering particles remain on the adhesive tape as paint disbonding. It is considered sufficient for the adhesive-tape tear-off test that the paint disbonding in the area of the weld seam amounts to maximally 5%.

The invention therefore suggests a new approach in that it is no longer attempted to avoid the formation of impurities or to remove the latter, but rather the impurities are formed such that they represent no obstacle to the subsequent painting process. It was found that, with suitable process parameters, an iron-oxide-containing layer is formed with an improved adhesion on the weld seam. As a result of the good adhesion of the iron-oxide-containing layer, a removal of the latter will not be necessary. Neither a finishing of the weld seam, nor a pretreatment in the paint shop, are required for removing the iron-oxide-containing layer. The number of necessary process steps can thereby be reduced. There is no loss of cycle time, which is why this process is particularly suitable for large-volume production.

Process parameters, by which the fraction of iron (II/III) oxide and therefore the adhesion of the iron-oxide-containing layer can be influenced, are, for example, the beam intensity, the focus position of the laser beam, the lateral angle of incidence of the laser beam and the longitudinal angle of incidence of the laser beam, the amount and type of inert gas, the amount of wire, and the robot speed.

In a further development, the longitudinal angle of incidence of the laser beam amounts to less than 85° (degrees); in particular, the longitudinal angle of incidence of the laser beam preferably amounts to at least 75° but less than 85°. Here, the longitudinal angle of incidence is the angle in the direction of the welding direction by which the laser beam is inclined with respect to the workpiece surface. A longitudinal angle of incidence of less than 90° means that the welding takes place in a dragging manner. As a result of the adjustment of the longitudinal angle of incidence in the above-mentioned range, a longer beaming effect on the weld is achieved, which has a positive effect on the structure of the iron-oxide-containing layer.

In a further development, the lateral angle of incidence of the laser beam is selected such that it amounts to more than 45° and, particularly, is in a range of more than 45° to maximally 60°. The lateral angle of incidence is the angle transversely with respect to the welding direction, by which the laser beam is inclined with respect to the workpiece surface. A temperature distribution in the top plate and bottom plate can thereby be obtained that is optimal for the adhesion suitability of the iron-oxide-containing layer.

The adhesion of the iron-oxide-containing layer can preferably be further promoted when the welding is a heat conduction welding; i.e. no vapor capillary is formed during the welding. The heat conduction welding can be implemented, for example, by a corresponding selection of the beam intensity ($<10^6$ W/cm$^2$). In an alternative embodiment, the focus position of the laser beam is above the joint, for example, by up to 5 mm above the joint. Preferably, the focus position of the laser beam may be situated 3 mm to 5 mm above the joint. The absolute temperatures, which are lower during thermal conduction welding than during deep welding, promote the formation of an adhering iron-oxide-containing layer.

In a preferred embodiment, a laser welding process with a tactile seam guidance is used, a filler wire simultaneously being used as a mechanical sensor for the seam guidance.

A bifocal lens system is preferably used for implementing the process. In the case of a bifocal lens system, the laser beam is divided into two beams which are guided closely side-by-side onto the workpiece.

The process according to the invention is particularly suitable for connecting a first and a second component in a material-bonding manner by means of a weld seam. Preferably, the first and second workpieces are body components of a vehicle body, and the weld seam is formed at a flanged folding of the first workpiece.

With respect to the component, the object of the invention is achieved by a component having at least a first workpiece and a weld seam formed at the first workpiece, an adhering iron-oxide-containing layer being arranged on the weld seam surface. The adhering iron-oxide-containing layer preferably completely covers the weld seam surface.

The component may consist of the first workpiece. As an alternative, the component may have the first workpiece as well as at least a second workpiece.

The first and second workpiece may, for example, be metal plates, which may either be flat metal plates or spatially shaped metal plates. As an alternative, the workpieces may, for example, be molded metal bodies, such as metal profiles. Preferably, these are steel plates. These may, for example, be zinc-coated or aluminum-coated steel plates.

The first and the second workpiece preferably are vehicle body parts, such as door plates, side members, etc. In a further development, the first workpiece may be an outside door panel and the second workpiece may be an inside door panel.

The weld seam may, for example, be shaped as a fillet weld or as a flanged folding. The fillet weld may, for example, be arranged at a lap joint, a T-joint or an angle joint. The flanged weld may extend, for example, along a flanged folding and close the latter. The weld seam may connect, for example, the first and second workpiece in a material-bonding manner. The first and second workpiece may, for example, be arranged to be partially overlapping, in which case the weld seam may be formed between the face of the second workpiece and the surface of the first workpiece as an edge fillet weld.

In a further development, the first workpiece has a flanged folding, and the weld seam is arranged at the flanged folding. The weld seam may, for example, be arranged as an edge fillet weld between the face of the second workpiece and the flanged folding of the first workpiece, for example, as an edge fillet weld between an outside door panel with the flanged folding and an inside door panel.

The weld seam may be constructed with or without a filler material. The weld seam is preferably constructed by using a filler wire.

The iron-oxide-containing layer may contain different iron oxides, for example, iron-(II)-oxide (FeO), iron(III)-oxide (Fe2O3), iron-(II/III)-oxide (Fe3O4). The iron oxide may be present, for example, as hematite and/or magnetite. The iron-oxide-containing layer may consist of iron-oxide. As an alternative, it may contain materials in addition to the iron oxide.

By means of the formation of the adhering iron-oxide-containing layer on the weld seam, a surface is provided which is suitable for a subsequent painting, without requiring seam finishing for ensuring the adhesion of the paint. The component thereby becomes particularly suitable for use in large-volume manufacturing.

The iron-oxide-containing layer preferably has a thickness in the range of 1 micrometer (μm) to 4 micrometers. In this thickness range, a particularly good stability and adhesion of the iron-oxide-containing layer is obtained. While conventional "scale" is present in a brittle and plate-shaped structure, the iron-oxide-containing layer preferably has a consistent layer structure.

The adhering iron-oxide-containing layer is particularly suitable for the subsequent painting process if it is electrically conductive. A cathodic dip paint can be deposited on the electrically conductive iron-oxide-containing layer.

The iron-oxide-containing layer is preferably magnetic, which promotes the phosphating in the subsequent painting process.

It was surprisingly found that, in the case of a laser welding process with a tactile seam guidance, wherein:

(a) the longitudinal angle of incidence of the laser head amounts to less than 85°;

(b) the lateral angle of incidence of the laser head amounts to more than 45°;

(c) the focus position of the laser beam is situated above the joint; and (d) a bifocal lens system is used, then an optimally adhering iron-oxide-containing layer can be formed on the weld seam. Thus, for example, door panels welded by means of this process exhibited no disbonding after the cathodic dip painting (KTL).

The above-described features, characteristics and advantages of this invention as well as the manner in which they are achieved become clearer and more easily understandable in the context of the following description of the embodiments. To the extent that the term "can or may" is used in this application, it relates to the technical possibility as well as to the actual technical implementation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
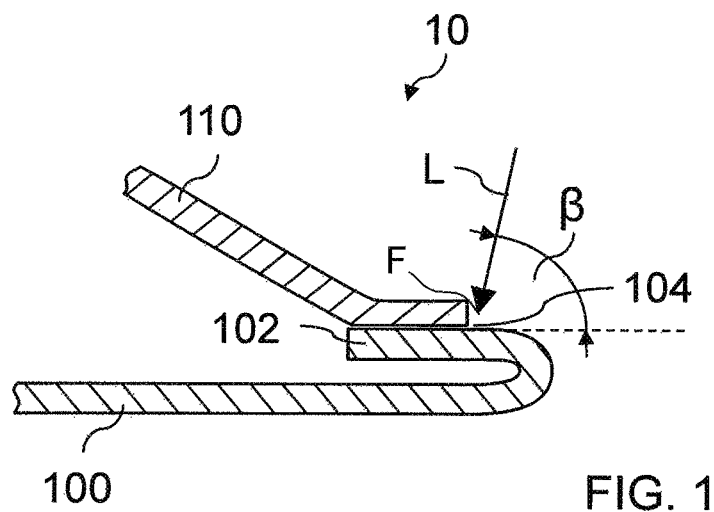
FIG. 1 is a sectional view of a component before the implementation of the welding process according to an embodiment of the invention.

FIG. 1 is a sectional view of the component 10 before the implementation of the welding process. The component 10 includes a first workpiece 100 and a second workpiece 110. The first workpiece 100 has a flanged fold 102. A joint 104 extends between the flanged fold 102 of the first workpiece 100 and an adjoining face of the second workpiece. In the embodiment illustrated in FIG. 1, the first workpiece 100 is an outside door panel and the second workpiece 110 is an inside door panel.

For forming a weld seam 120, a laser welding head with a tactile seam guidance directs laser radiation at a lateral angle of incidence β over the joint 104, the lateral angle of incidence amounting to more than 45 degrees. Furthermore, the laser radiation is directed in a dragging manner at a longitudinal angle of incidence over the joint 104, the longitudinal angle of incidence being smaller than 85 degrees. Preferably, a bifocal lens system is used, which is why two laser beams L impinge on the component 10, but for reasons of representability, FIG. 1 shows only one laser beam L. The focus F of the laser beams L is situated above the joint 104.

Figure 2:
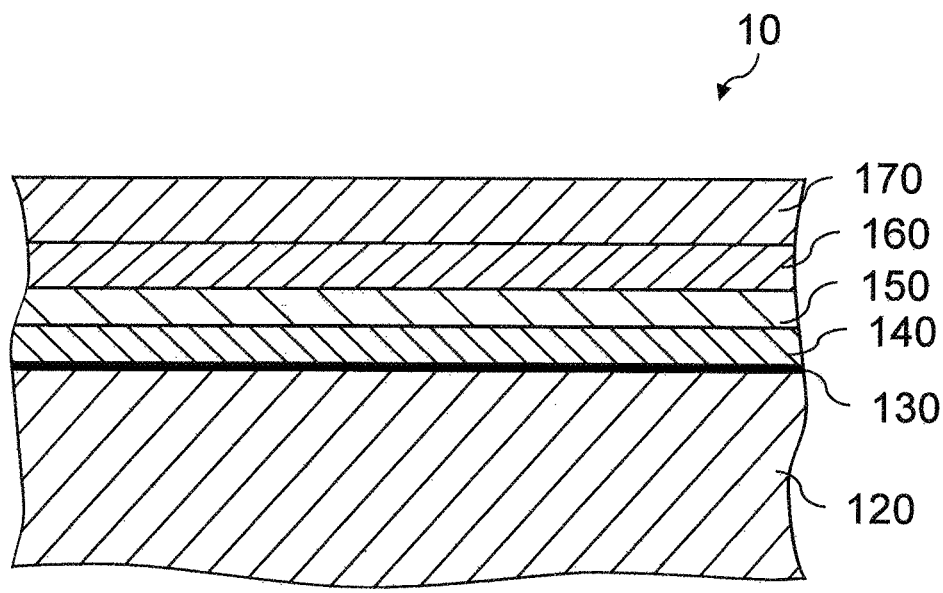
FIG. 2 is a sectional view along the welded seam of the welded component in the painted state.

FIG. 2 is a sectional view of the welded component 10 along the weld seam 120. During the welding process, an adhering iron-oxide containing layer 130 has formed on the weld seam 120. The adhering iron-oxide-containing layer 130 preferably has a thickness in the range of 1 to 4 micrometers. The adhering iron-oxide-containing layer 130 is preferably formed directly on the weld seam 120 and extends over the entire surface of the weld seam 120. The adhering iron-oxide-containing layer 130 permits sufficient adhesion of subsequent paint layers. A first paint layer 140 is applied to the adhering iron-oxide-containing layer 130. The first paint layer 140 may, for example be a primer, such as a layer of a cathodic dip paint. A second paint layer 150 is arranged on the first paint layer 140. The second paint layer 150 may, for example, be a filler or primer, which is used for improving the surface condition/adhesion. A third paint layer 160 is arranged on the second paint layer 150, which third paint layer 160 consists, for example, of a base coat. A fourth paint layer 170 is arranged on the third paint layer 160, which fourth paint layer 170, for example, is a clear coat. Although FIG. 2 shows a paint buildup of four layers, as an alternative, more or fewer paint layers may be arranged over the adhering iron-oxide-containing layer 130.

As a result of the good adhesion of the iron-oxide-containing layer 130, a removal or finishing of the latter before the painting of the workpiece 10 will not be necessary and the iron-oxide-containing layer 130 can remain on the weld seam 120.

The embodiments are not to scale and not limiting. Modifications within the scope of actions of persons skilled in the art are contemplated.

LIST OF REFERENCE SYMBOLS

10 Component
100, 110 Workpiece
102 Flanged fold
104 Joint
120 Weld seam
130 Adhering iron-oxide-containing layer
140,150,160,170 Paint layers
L Laser beam
β Lateral angle of incidence The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for influencing a surface condition of a laser weld seam at a joint between vehicle body parts, the process comprising the acts of:
selecting an amount and type of inert gas to be present and at least one parameter from the group of parameters including a laser beam intensity, a laser beam focus position, a laser beam angle of incidence transverse to a welding direction with respect to a surface of one of the vehicle body parts, a laser beam angle of incidence in the welding direction with respect to the surface of the one of the body parts, and a welding speed when producing the weld seam at the joint between the vehicle body parts; and
producing both the weld seam and an iron-oxide containing layer that limits paint disbonding adhering to the weld seam by guiding at least one laser beam, with the selected amount and type of inert gas present, and with at least one of the selected laser beam intensity, at the selected laser beam focus position, at the selected laser beam angle of incidence transverse to the welding direction, at the selected laser beam angle of incidence in the welding direction, and at the selected welding speed, over the vehicle body parts.

2. The process according to claim 1, wherein the act of guiding the at least one laser beam is carried out with the laser beam angle of incidence in the welding direction at less than 85°.

3. The process according to claim 2, wherein the act of guiding the at least one laser beam is carried out with the laser beam angle of incidence transverse to the welding direction of more than 45°.

4. The process according to claim 1, wherein the act of guiding the at least one laser beam is carried out with the laser beam angle of incidence in the welding direction at less than 75°.

5. The process according to claim 4, wherein the act of guiding the at least one laser beam is carried out with the laser beam angle of incidence transverse to the welding direction in a range of 45° to 60°.

6. The process according to claim 5, wherein the at least one parameter selected includes the focus position of the at least one laser beam, and the focus position is between 3 millimeters to 5 millimeters above the joint between the vehicle body parts.

7. The process according to claim 1, wherein the act of guiding the at least one laser beam is carried out with the laser beam angle of incidence transverse to the welding direction at more than 45°.

8. The process according to claim 1, wherein the act of guiding the at least one laser beam is carried out with the laser beam angle of incidence transverse to the welding direction in a range of 45° to 60°.

9. The process according to claim 1, wherein producing both the weld seam and the iron-oxide containing layer that limits paint disbanding is carried out by heat conduction welding.

10. The process according to claim 1, wherein the at least one parameter selected includes the focus position of the at least one laser beam, and the focus position of the at least one laser beam is above the joint between the vehicle body parts.

11. The process according to claim 10, wherein the focus position is between 3 millimeters to 5 millimeters above the joint between the vehicle body parts.

12. The process according to claim 1, wherein a bifocal lens system is used in the process and two laser beams are guided over the joint between the vehicle body parts.

13. The process according to claim 1, wherein the weld seam connects first and second vehicle body parts together in a material-bonding manner.

14. The process according to claim 13, wherein the weld seam is formed at a flanged fold of one of the first and second vehicle body parts.

15. The process according to claim 1, wherein the paint disbonding is limited to 5% maximum in an adhesive tape tear-off test conducted after painting.

* * * * *